Sept. 14, 1965
R. N. MANTEY
3,205,989
ELECTROMAGNETIC CLUTCH HAVING A SHOCK ABSORBING
ELASTOMERIC RING
Filed May 19, 1961

INVENTOR.
Raymond N. Mantey
BY Carl A. Stickel
His Attorney

United States Patent Office 3,205,989
Patented Sept. 14, 1965

3,205,989
ELECTROMAGNETIC CLUTCH HAVING A SHOCK ABSORBING ELASTOMERIC RING
Raymond N. Mantey, Dayton, Ohio, assignor to General Motors Corporation, Detroit, Mich., a corporation of Delaware
Filed May 19, 1961, Ser. No. 111,265
1 Claim. (Cl. 192—84)

This invention pertains to electromagnetic clutches and especially to means associated with such clutches for preventing damage to the clutch and to the devices connected by the clutch.

Electromagnetic clutches and the devices connected by the electromagnetic clutches are subject to many destructive forces. Vibrations of various types can be extremely destructive at resonant frequencies. For example, if the shaft connected to the clutch is driven for extended periods under torsional vibration at resonant frequencies, the life will be short and breakage will quickly occur. Furthermore, since electromagnetic clutches engage quickly and suddenly, there is a sharp shock to the clutch and also to the devices connected by the clutch. Also, in event of some failure in the devices connected by the electromagnetic clutch, it is often desirable to disconnect the devices to prevent irreparable damage.

It is an object of this invention to provide a simple, inexpensive means for preventing damage to magnetic clutches and the devices connected by them.

It is another object of this invention to provide a simple, inexpensive elastomeric connection in an electromagnetic clutch for preventing destructive vibrations and shock to the clutch and to the devices connected by the clutch.

It is another object of this invention to provide simple, inexpensive means for preventing destructive vibrations in magnetic clutches and the devices connected by them which will also serve to disconnect the devices to prevent irreparable damage under dangerous conditions.

These and other objects are attained in the form shown in the drawings in which a pulley is continuously rotated by an engine during the operation of the engine. A stationary electromagnetic coil is magnetically associated with the pulley. An armature is magnetically associated with the pulley and the electromagnet and through leaf springs connects with a metal ring bonded to one face of an elastomeric ring. This elastomeric ring is bonded to a disk connecting with the drive shaft of a compressor. The elastomeric ring absorbs shocks and vibrations and prevents destructive torsional vibration of the shaft of the compressor at resonant frequencies. In the event that the compressor should bind for failure of lubrication or any other cause, the magnetic clutch will slip and heat up so as to destroy the elastomeric ring and disconnect the driving engine from the compressor to prevent irreparable damage to the compressor.

Further objects and advantages of the present invention will be apparent from the following description, reference being had to the accompanying drawings wherein preferred embodiments of the present invention are clearly shown.

Figure 1:
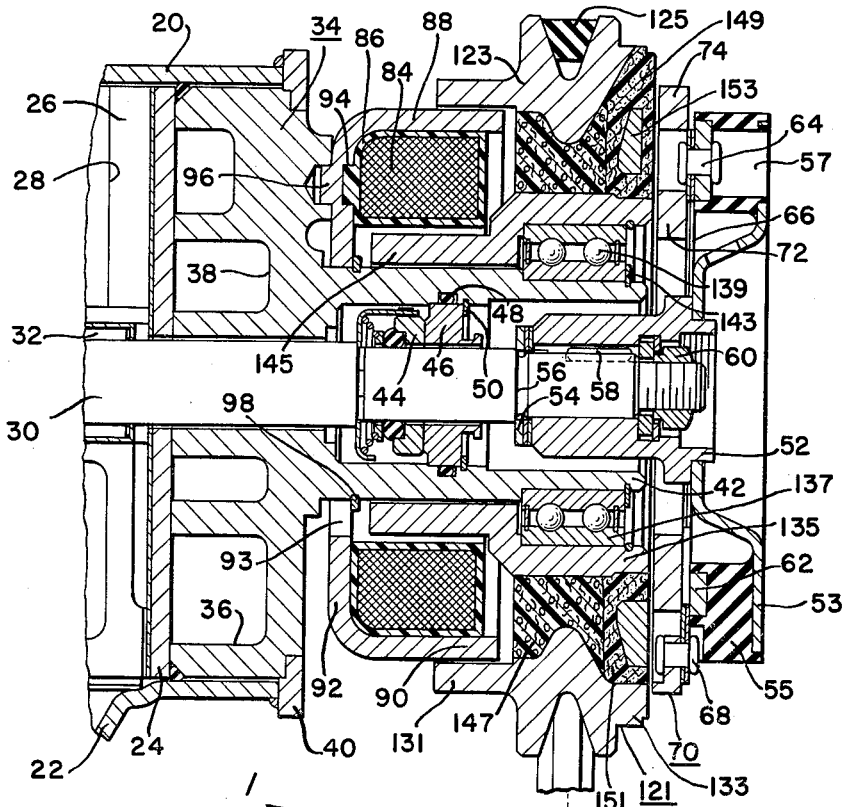
FIGURE 1 is a sectional view through an electromagnetic clutch embodying one form of my invention taken substantially along the line 1—1 of FIGURE 2.
Figure 2:
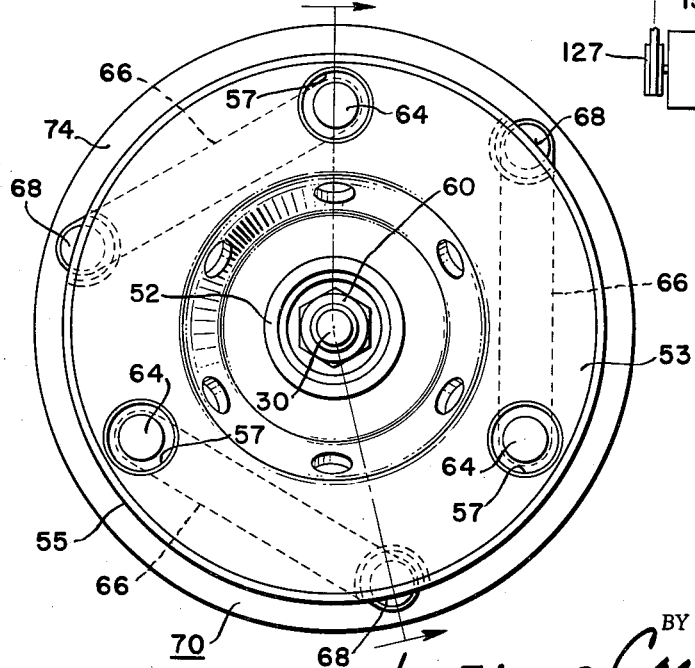
FIGURE 2 is an end view of the clutch shown in FIGURE 1.

Referring now to the drawings and more particularly to FIGURE 1, there is shown a device to be driven such as a refrigerant compressor 20 provided with a housing 22 surrounding the valve plate 24 and a plurality of cylinders 26 containing pistons 28 which are operated by the drive shaft 30 rotatably mounted in the needle bearings 32. The housing 22 also includes the discharge chamber 36 as well as the inlet chambers 38. The housing 22 is also provided with a mounting ring 40.

The discharge head 34 which includes the discharge and inlet chambers 36 and 38 is provided with integral tubular extension 42. The driven shaft 30 extends outwardly through this tubular extension 42 and is provided with a rotating shaft seal 44. This rotating shaft seal 44 is pressed into sealing engagement with the stationary seal ring 46 sealed to the tubular extension 42 by a gasket seal ring 48 lodged in a groove in the extension 42. The seal ring 46 is lodged against an inner shoulder within the tubular extension 42 and is locked in place by a split locking ring 50 held within a groove in the tubular extension 42. The inner bore of the tubular extension 42 is enlarged for easy removal of the lock ring 50, the seal ring 46, and the rotating part 44 of the shaft seal.

The enlarged inner bore of the tubular extension 42 provides room for the greater portion of the hub 52 which is mounted upon the reduced end portion of the shaft 30 with spacing rings 54 provided between the inner end of the hub 52 and the shoulder 56 on the shaft 30. The hub 52 is keyed to the shaft 30 by a cylindrical key 58 and is held on the end of the shaft by a nut 60. Welded or otherwise bonded onto the hub 52 is a disk 53 of steel to which is bonded an elastomeric ring 55. This torsionally resilient elastomeric ring may be any suitable natural or synthetic rubber such as GRS butadiene styrene or butyl rubber. It is torsionally resilient relative to the axis of the shaft 30 and the outer concentric parts. This elastomeric ring 55 is bonded to a metal ring 62. The elastomeric ring 55 is provided with three apertures 57 where the metal ring 62 is connected by the rivets 64 to three double thickness leaf springs 66 extending from the rivets 64 in a direction opposite the direction of rotation. The leaf springs 66 are connected at their other ends by the rivets 68 to the armature plate 70 of paramagnetic material such as low carbon steel. This armature plate 70 is divided into an inner ring 72 and an outer ring 74 connected by integral webs as shown in patent 3,082,933 issued March 26, 1963. As shown, the leaf springs 66 are flat and exactly perpendicular to the axis of rotation in the unattracted position. The arrangement is such that, when the armature is attracted, the springs are bent toward the contacting frictional surfaces causing the springs to extend at a slight angle relative to the perpendicular to the axis of rotation. Since the springs 66 are in compression when the armature plate 70 engages the frictional driving surface, the reaction causes a component of force which in a self-energizing action tends to augment the magnetic pull upon the armature against the frictional driving surface 149 to increase the contact pressure and thus to increase the driving torque.

For attracting the armature plate 70, there is provided an annular coil 84 of many turns surrounding the tubular extension 42. This coil 84 is embedded within and surrounded by a suitable resin 86 such as epoxy or nylon or polyester resin, which is cast within the coil housing 88. The coil housing 88 includes a horizontal flange portion 90 extending toward the armature plate 70 and a radial portion 92 extending inwardly to the tubular extension 42. The coil housing 88 of paramagnetic material, such as steel or malleable iron, is provided with three locking recesses 94 into which the resin 86 is cast. In addition, the coil housing 88 is provided with three integral projections 96 which extend within three recesses in the discharge head 34 and form an interlocking connection preventing rotation of the coil housing 88 and the coil 84 around the tubular extension 42. The coil housing 88 is held axially against the discharge head 34 by a snap ring 98 engaging a groove in the outer periphery of the tubular extension and fitting against the adjacent base of the radially extending flange 92 of the coil housing 88. The flange 92 has its inner periphery scalloped or notched as indicated by the reference character 93.

The drive pulley 121 has inner and outer rings of paramagnetic material such as malleable iron. It has on its malleable iron outer rim 123 a V-belt pulley groove containing a V-belt 125 providing a driving connection with the pulley 127 upon the crank shaft of the automobile engine 129. The outer rim 123 of the pulley 121 is provided with a cylindrical flange 131 extending in telescoping arrangement with the cylindrical flange 90 of the coil housing 88 to provide an efficient magnetic bridge therewith. The pulley rim 123 is also provided with a circular flange 133 extending in the opposite direction for providing a magnetic bridge with the outer ring 74 of the armature plate 70.

The pulley 121 has an inner sleeve 135 of paramagnetic material, such as malleable iron or steel, concentric with the tubular extension 42 and the shaft 30. It receives the outer race 137 of a double row ball bearing 139 which is locked against a shoulder on the tubular extension 42 by a snap ring 143 which is lodged within a groove on the outer periphery of the tubular extension directly against the inner race of the bearing 139. The sleeve 135 is of substantially uniform cross-sectional area in the axial direction, and has a cylindrical portion 145 extending between the coil 84 and the adjacent portion of the tubular extension 42 to provide a magnetic bridge primarily with the tubular extension 42 and secondarily with the coil 84. The sleeve 135 is close to the tubular extension 42 but is spaced from the coil 84 sufficiently to permit the flow of substantial amounts of air therebetween.

The outer rim 123 and the sleeve 135 are bonded together by a brake lining material 147 but containing nonmagnetic metal particles for improving the heat conductivity. Preferably, this material 147 contains about 36% to 39% asbestos fiber, 30% to 27% phenolformaldehyde resin and about 34% by weight of aluminum chips. Instead of asbestos fibers, there may be substituted glass or rock wool fibers. Instead of phenolformaldehyde resin, there may be substituted epoxy resin containing a hardener such as pyromellitic dianhydride and furfural alcohol. Instead of aluminum chips, there may be used other nonmetallic metal chips such as copper or brass chips or powder. This material is nonmagnetic and magnetically separates the rim 123 from the ring-shaped sleeve 135. It joins then so as to make a unitary pulley. It also serves to cool the double row ball bearing 139. The heat from the discharge head tends to flow through the tubular extension 42 to heat the ball bearing 139. Frequent clutching and declutching of the clutch also serve to heat the bearing 139. The material 147 containing the aluminum chips has sufficient heat conducting capacity, since it is of considerable width, to transmit a substantial portion of the heat to the rim 123 where the air has free access to it to dissipate the heat therefrom. Since this rim 123 is continuously rotated in the air, it has great heat dissipating capacity.

For the frictional surface 149 of the pulley 121, a material 151 of a different composition is provided which includes scouring particles or powders. Preferably, this material 151 is formed from about 3% aluminum oxide powder, 53% to 56% asbestos fibers and 44% to 41% phenolformaldehyde resin. This material also holds and supports the annular interpole ring 153 spaced from and magnetically separated from the pulley ring 123 and the inner pulley sleeve 135. To extend the cleaning and scouring action of the material 151, the interpole ring 153 is provided with three circular or frusto-circular depressions or recesses which are filled with this scouring resin. The ring 153 is also reduced in width at these depressions by providing reduced milled surfaces on both sides of the depressions. The flange 133 is also provided with four transverse slots which are also filled with the resin containing the scouring material. Thus all of the slots and depressions and the areas between the sleeve 135 and the ring 153 and the flange 133 are all filled with the material 151 containing the scouring powder, aluminum oxide. This material 151 in an irregular path extends continuously from the innermost edge to the outermost edge of the pole faces.

When the adjacent surface of the magnetic armature plate 70 engages the surfaces 149 of the pulley 121, there is some sliding of the surfaces relative to each other, causing the surface of the material 151 to wipe all the contacting surfaces of the armature plate 70 to keep it clean and free from contamination and glazing and galling. Both the materials 147 and 151 provide a strong bond with each other and with the inner sleeve 135, the interpole ring 153 and the outer rim 123. Both materials are wear-resistant and heat-resistant and the material 151 has a high coefficient of friction with the metal of the armature plate 70. The energization of the armature coil 84 generates a flux which may be considered as flowing through the coil housing 88 inwardly through the inwardly extending flange 92 to and through the tubular extension 42 and crosses a small air gap to the inner portion of the sleeve 135, from which it flows forwardly through the front pole face thereof and across the inner ring 72 of the armature plate 70 and through this ring and across the gap between the adjacent surfaces to the interpole ring 153 from which the magnetic circuit extends across the gap to and through the outer ring 74 of the armature plate 70 and thence through the rim 123 to the flange 131 and across the narrow air gap to the flange 90 of the coil housing 88. The parts in this magnetic circuit are such an arrangement that the maximum flux density is created at the pole faces of the pulley 121 and the armature plate 70 so as to provide a very high attractive force between them which pulls the armature plate 70 firmly into engagement with the surface 149 of the pulley 121 to provide a frictional driving engagement to cause the continuously rotating driving pulley to drive through the surface 149 to the armature plate 70 through the springs 66, the metal ring 62, the elastomeric ring 55 and the disk 53 to the hub 52 and the shaft 30.

The shock of the engagement of the armature plate 70 which is normally stationary and the surface 149 of the pulley 121 which rotates continuously is absorbed by the elastomeric ring 55 which relieves a considerable portion of the shock on the springs 66 and the hub 52 as well as the connection of the hub with the shaft 30. It also removes the shock from the shaft 30. Should the engine 129 drive the shaft 30 at such a speed which would tend to set up torsional vibrations in the shaft 30, these torsional vibrations will be damped by the elastomeric ring 55 and prevented from becoming destructive. This prevents breakage of the shaft 30 by torsional vibration. Should any parts of the compressor 20 seize because of failure of lubrication or otherwise, the clutch will slip. This slippage will be between the armature plate 70 and the pulley 121. The friction due to this slippage will heat up the clutch causing disintegration of the elastomeric ring 55 thereby disconnecting the pulley 121 from the shaft 30 before any of the other parts are damaged by excessive heat. This prevents excessive damage to the compressor and the clutch. The assembly of parts containing the elastomeric ring 55 are readily accessible and therefore are readily removed and replaced. In this way, improved connection is provided for the electromagnetic clutch and the compressor 20 as well as the engine 129.

While the embodiments of the present invention as herein disclosed constitute preferred forms, it is to be understood that other forms might be adopted.

What is claimed is as follows:

In combination, a rotatable driving element, a rotatable driven element, electromagnetic means associated with said driving element, a member connected to said driven element, an elastomeric ring bonded to said member, a metal ring bonded to said elastomeric ring, armature means located in the magnetic field of said electromagnetic means, and spring means connecting said metal ring and said armature means.

References Cited by the Examiner
UNITED STATES PATENTS

| | | | |
|---|---|---|---|
| 1,919,523 | 7/33 | Meyer | 192—52 |
| 1,925,278 | 9/33 | Paton | 192—55 |
| 2,105,188 | 1/38 | Guy | 192—55 |
| 2,873,010 | 2/59 | Alma | 192—88 |
| 2,912,963 | 11/59 | Dufresne. | |
| 2,985,271 | 5/61 | Wilson | 192—55 |
| 2,986,251 | 5/61 | Pitts | 192—84 |
| 3,082,933 | 3/63 | Bernard | 192—84 X |

DAVID J. WILLIAMOWSKY, *Primary Examiner.*

THOMAS J. HICKEY, *Examiner.*